(12) United States Patent
Hornthal et al.

(10) Patent No.: US 8,666,839 B2
(45) Date of Patent: Mar. 4, 2014

(54) PROVIDING TRAVEL DESTINATION INFORMATION

(75) Inventors: Jim Hornthal, San Francisco, CA (US); Sharlene Wang, Sunnyvale, CA (US); Patrick Middleton, Greenbrae, CA (US); Patrick McKeever, San Francisco, CA (US); Nishant Menon, Fremont, CA (US); Stuart Dodgson, Alameda, CA (US)

(73) Assignee: Triporati, Inc., San Francisco, CA (US)

( * ) Notice: Subject to any disclaimer, the term of this patent is extended or adjusted under 35 U.S.C. 154(b) by 0 days.

(21) Appl. No.: 13/558,276

(22) Filed: Jul. 25, 2012

(65) Prior Publication Data

US 2014/0006215 A1     Jan. 2, 2014

Related U.S. Application Data

(60) Provisional application No. 61/667,372, filed on Jul. 2, 2012.

(51) Int. Cl.
    *G06Q 30/00*          (2012.01)

(52) U.S. Cl.
    USPC ........................................................ 705/26.1

(58) Field of Classification Search
    USPC ........................................................ 705/26.1
    See application file for complete search history.

(56) References Cited

U.S. PATENT DOCUMENTS

2006/0129438 A1*   6/2006   Robinson ........................ 705/6
2012/0191492 A1*   7/2012   Diba et al. ....................... 705/6

\* cited by examiner

*Primary Examiner* — Mila Airapetian
(74) *Attorney, Agent, or Firm* — Trellis IP Law Group, PC

(57) ABSTRACT

Embodiments generally relate to providing travel destinations. In one embodiment, a method includes obtaining first travel destination information associated with a first travel destination. The method also includes determining one or more alternative travel destinations based on similarities between each alternative travel destination and the first travel destination and based on pricing. The method also includes providing the one or more alternative travel destinations and pricing.

19 Claims, 10 Drawing Sheets

PLAN YOUR TRIP

Flight
◉ Roundtrip  ○ One way  ○ Multiple Destinations

Leaving from:  Departing:  Departing:
Seattle, WA, United States | 07/11/2012 | Any Going to:  Returning:  Returning:
Montego Bay, Jamaica | 07/18/2012 | Any Adults (18-64)  Seniors (65+)  Children (0-17)
2 | 0 | 1

SEARCH FOR FLIGHTS    SEARCH FOR PACKAGES
402    404                    406

PROVIDING TRAVEL DESTINATION INFORMATION

CROSS REFERENCES TO RELATED APPLICATIONS

This application claims priority from U.S. Provisional Patent Application Ser. No. 61/667,372, entitled PROVIDING TRAVEL DESTINATION INFORMATION, filed on Jul. 2, 2012, which is hereby incorporated by reference as if set forth in full in this application for all purposes.

BACKGROUND

Particular embodiments generally relate to providing travel destinations. Travelers often visit different websites to learn about various destinations when planning a trip, such as a vacation. Also, travelers can search for airfare, hotels, and other things that need to be purchased for a trip. The amount of information on the Internet is significant and can be overwhelming, and a user cannot possibly find all relevant and useful information efficiently in a short amount of time. For a traveler, determining where to go is complicated by the wealth of information scattered on the Internet.

SUMMARY

Embodiments generally relate to providing travel destinations. In one embodiment, a method includes obtaining first travel destination information associated with a first travel destination. The method also includes determining one or more alternative travel destinations based on similarities between each alternative travel destination and the first travel destination and based on pricing. The method also includes providing the one or more alternative travel destinations and pricing.

A further understanding of the nature and the advantages of particular embodiments disclosed herein may be realized by reference of the remaining portions of the specification and the attached drawings.

BRIEF DESCRIPTION OF THE DRAWINGS

FIG. 4 illustrates an example simplified user interface for enabling a user to search for travel destination information.

DETAILED DESCRIPTION

Embodiments described herein enable and facilitate a user in selecting a travel destination by providing alternative travel destinations to the user when making a selection. As described in more detail below, a system obtains initial travel destination information associated with an initial travel destination. The initial travel destination information is based on a search that is initiated by the user based on search criteria such as travel destination, travel dates, etc. Based on the initial travel destination information, the system determines and provides alternative travel destinations and corresponding pricing. These alternative travel destinations have similar attributes to those of the initial travel destination. Embodiments also provide the user with detailed information on the alternative travel destinations. In one embodiment, the system enables the user to customize an interest profile. The system may then use the customized interest profile to provide updated alternative travel destination that are based on the customized interest profile.

Figure 1:
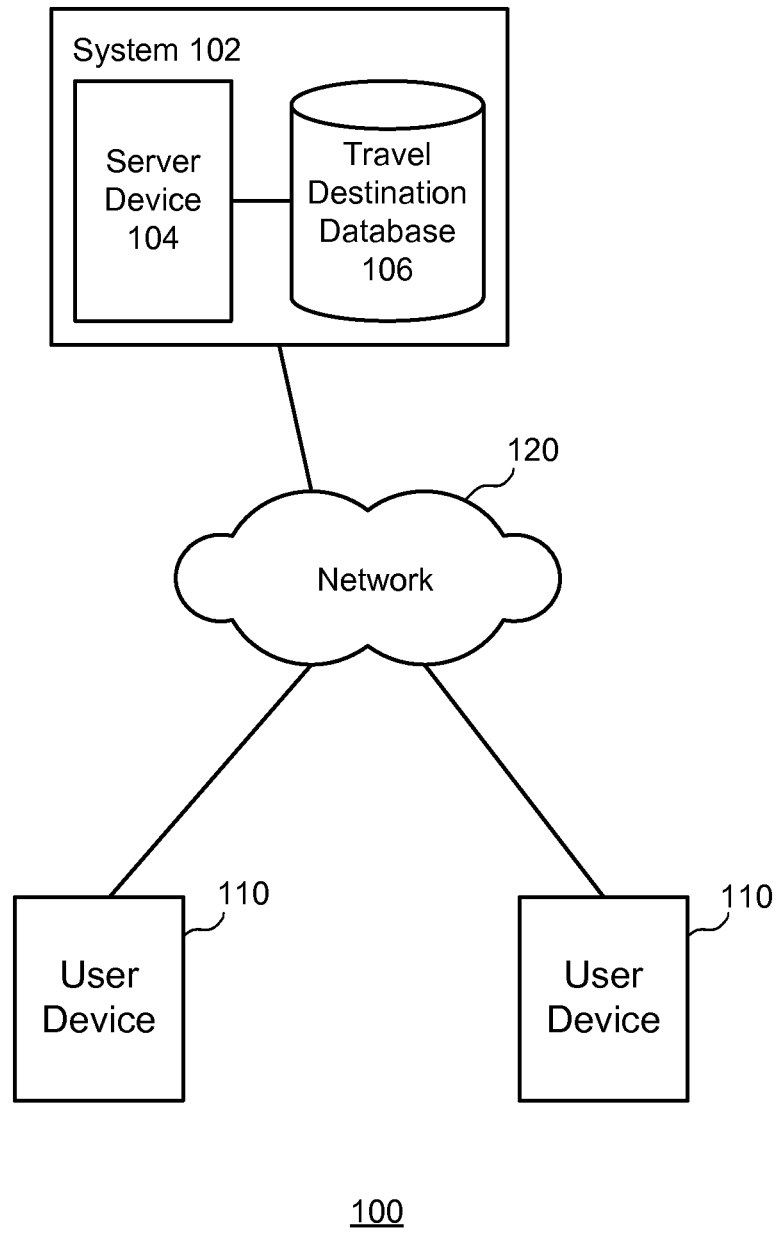
FIG. 1 illustrates a block diagram of an example environment, which may be used to implement the embodiments described herein.

FIG. 1 illustrates a block diagram of an example environment 100, which may be used to implement the embodiments described herein. In one embodiment, environment 100 includes a system 102, which includes a server device 104 and a travel destination database 106. System 102 is accessible to user devices 110 via a network 120. System 102 may be an on-demand database system such as a cloud service provider, which provides resources to partners and/or end-customers as a service. In other embodiments, environment 110 may not have all of the components listed and/or may have other components instead of, or in addition to, those listed above. Travel destination database 106 may store historical pricing information associated with travel destinations. Such historical pricing information may be based on various aspects such as travel destination, season, travel dates, length of stay, etc.

User devices 110 may be any suitable computing devices that can be used by users. For example, user devices 110 may include personal computers, laptop computers, cellular phones, personal digital assistants (PDAs), portable email devices, smart phones, etc. Various users may use user devices 110 to communicate with system 102. Software may be installed on user devices 110 to allow viewing of various pages, such as web pages. In one example, user devices 110 and system 102 communicate in a client or server environment that is commonly known as the Internet. The software may include a web browser in which web pages may be served to user devices 110.

Figure 2:
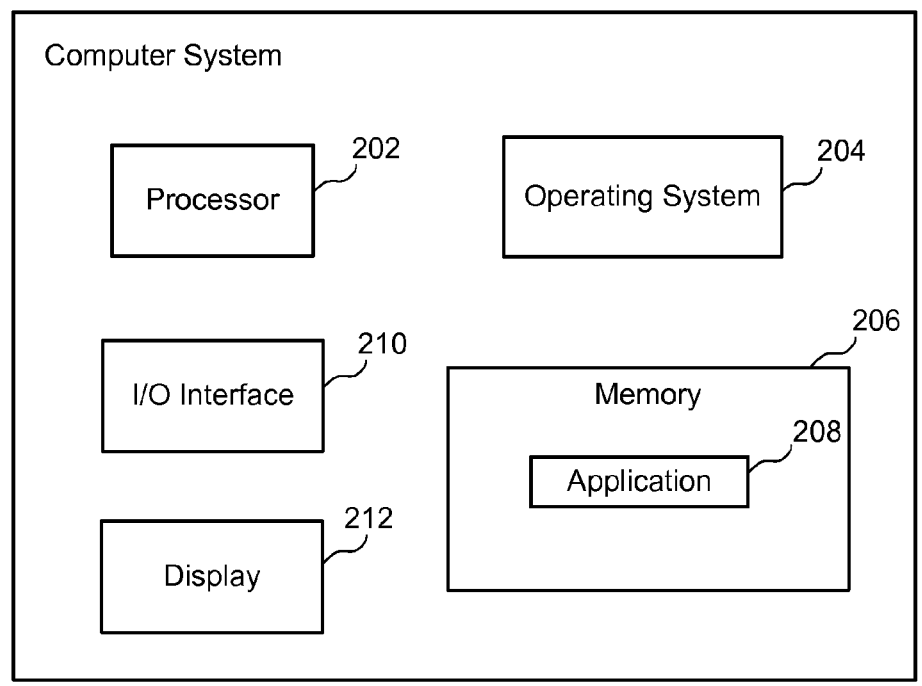
FIG. 2 is a block diagram of an example computer system, which may be used to implement the embodiments described herein.

FIG. 2 is a block diagram of an example computer system 200, which may be used to implement the embodiments described herein. For example computer system 200 may be used to implement system 102 or any of user devices 110 of FIG. 1. In one embodiment, computer system 200 may include a processor 202, an operating system 204, a memory 206, an input/output (I/O) interface 210, and display 212. Software application 208 may be stored on memory 206 or on any other suitable storage location or computer-readable medium. Software application 208 provides instructions that enable processor 202 to perform the functions described herein. In other embodiments, computer system 200 may not have all of the components listed and/or may have other components instead of, or in addition to, those listed above. The components of computer system 200 may be implemented by one or more processors or any combination of hardware devices, as well as any combination of hardware, software, firmware, etc.

Figure 3:
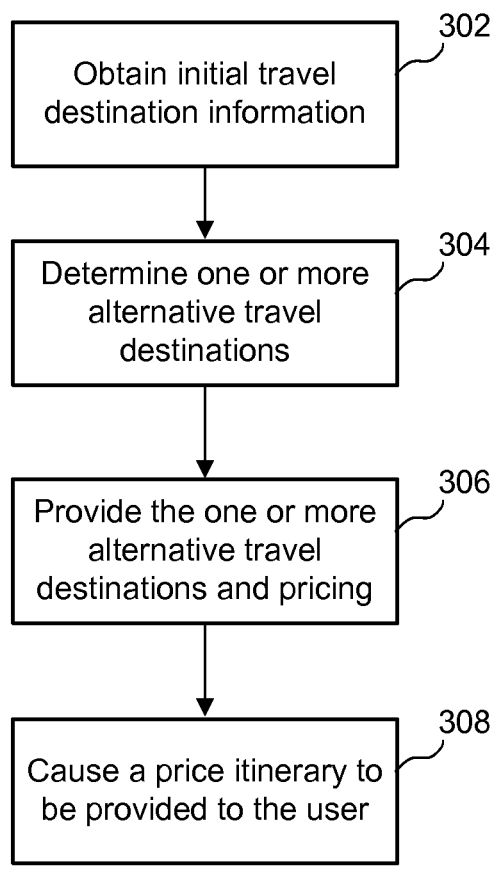
FIG. 3 illustrates an example simplified flow diagram for providing alternative travel destinations, according to one embodiment.

FIG. 3 illustrates an example simplified flow diagram for providing alternative travel destinations, according to one embodiment. Referring to both FIGS. 1 and 3, a method is initiated in block 302, where system 102 obtains initial travel destination information associated with an initial travel destination. In one embodiment, the initial travel destination information is generated based on a search inquiry that is initiated by a user. For example, the user may initiate an inquiry for travel destination information based on search criteria such as a departure location, travel destination, a departure date, a return date, where the inquiry results in the travel destination information.

FIG. 4 illustrates an example simplified user interface 400 for enabling a user to search for travel destination information. As shown, user interface 400 includes a trip search section 402, where a user may enter search criteria such as a departure location, a travel destination, a departure date, a return date, etc. The particular types of search criteria may vary, depending on the particular implementation. For example, the user may also specify whether the trip is to be roundtrip, one way, or includes multiple destinations. The user may also specify passenger information such as the number of passengers, ages of the passengers, etc. In one embodiment, user interface 400 includes a search for flights tab 404, which enables the user to initiate a search for flights. In one embodiment, user interface 400 includes a search for packages tab 406, which enables the user to search for vacation packages. In one embodiment, a vacation package may include airfare/hotel combinations, etc.

In one embodiment, system 102 may provide user interface 400 to the user in order to obtain the initial travel destination information. In another embodiment, any other suitable system such as a third-party system may provide user interface 400 to the user in order to obtain the initial travel destination information. In such an embodiment, system 102 may obtain the initial travel destination information from the other system.

Referring again to FIG. 3, in block 304, system 102 determines one or more alternative travel destinations. In various embodiments, system 102 determines the one or more alternative travel destinations based on similarities between each alternative travel destination and the first travel destination and based on pricing. Example embodiments involving similarities between each alternative travel destination are described in more detail below in connection with FIGS. 8 and 9. Example embodiments involving pricing of alternative travel destinations are described in more detail below in connection with FIG. 5.

Figure 5:
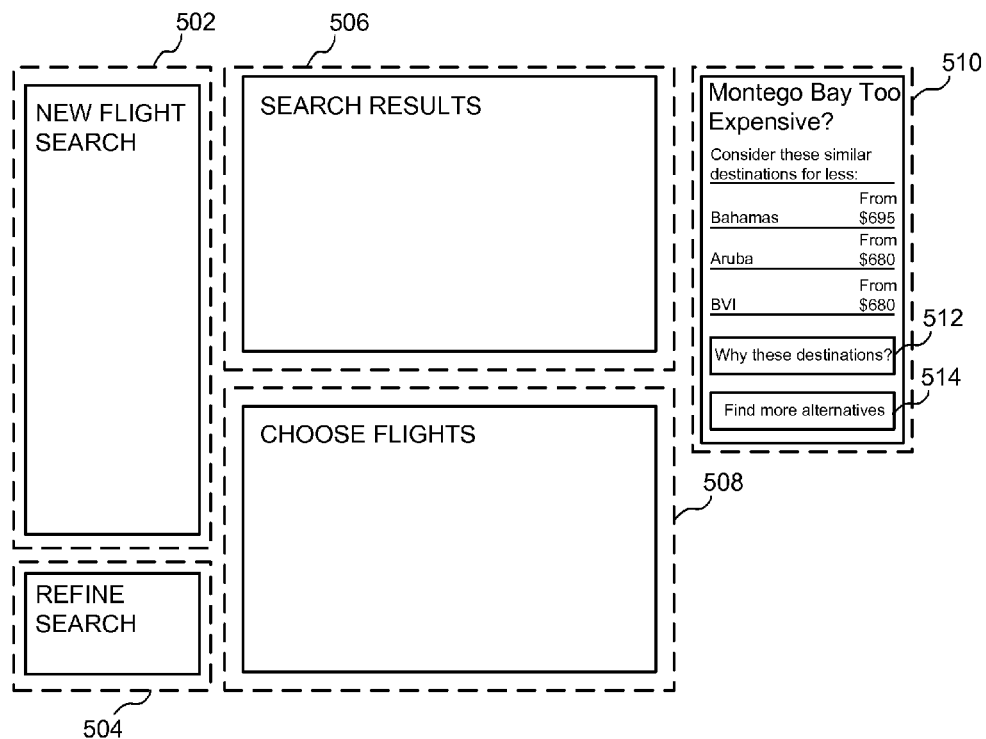
FIG. 5 illustrates an example simplified user interface showing travel destination information, according to one embodiment.

In block 306, system 102 provides the one or more alternative travel destinations and corresponding pricing to the user. FIG. 5 illustrates an example simplified user interface 500 showing travel destination information, according to one embodiment. As shown, user interface 500 may include various travel destination sections. For example, in one embodiment, user interface 500 may include a trip search section 502, a search refine section 504, a results summary section 506, a flight information section 508, and an alternative travel destinations section 510.

In one embodiment, system 102 may provide user interface 500 to the user. In another embodiment, any other suitable system such as a third-party system may generate trip search section 502, search refine section 504, results summary section 506, and flight information section 508, and cause these sections to be displayed in user interface 500.

In one embodiment, system 102 generates alternative travel destinations section 510 and causes alternative travel destinations section 510 to be displayed in user interface 500. In various embodiments, alternative travel destinations section 510 may be a module user interface that is embedded in a user interface provided by another system, and the other system may be a third-party system.

In one embodiment, trip search section 502 may include information that is similar to the search criteria entered by the user (e.g., as shown in FIG. 4). System 102 may enable the user to modify the search criteria in order to initiate a new search via trip search section 502. In one embodiment, search refine section 504 enables the user to refine the search.

In one embodiment, results summary section 506 may show various search results associated with the initial travel destination, where the travel destination information is generated based on a search inquiry. For example, the search results section may show prices for various airline companies. The search results section may show pricing tiers based on the number of stops (e.g., nonstop, 1 stop, 2+ stops, etc.).

As shown, alternative travel destinations section 510 shows alternative travel destination information. In this example, alternative travel destination section 510 shows alternative travel destinations and corresponding prices. The corresponding prices may be roundtrip pricing, and/or other relevant travel pricing (e.g., travel package pricing, etc.).

For ease of illustration, FIG. 5 shows alternative travel destination information for one direction of the user's search. For example, the prices shown in alternative travel destination section 510 are associated with round trip flights. In various embodiments, system 102 may also provide initial travel destination information and alternative travel destination information for vacation packages. In one embodiment, system 102 may provide tabs in order to enable the user to view roundtrip flights or show vacation package pricing.

For example, embodiments described herein may provide various types pricing associated with alternative travel destinations. In one embodiment, the pricing may include airfare pricing. In another embodiment, the pricing may include pricing for vacation packages, etc.

In one embodiment, system 102 may retrieve the pricing information (e.g., airfare, vacation packages, etc.) for the alternative travel destinations from any suitable cached memory location and/or database (e.g., travel destination database 106). In one embodiment, the pricing information includes preliminary pricing, which system 102 may derive from historical pricing based on various aspects such as travel destination, season, travel dates, length of stay, etc. In one embodiment, in addition to historical pricing, system 102 may also derive the preliminary pricing based at least in part on predictive pricing. Such predictive pricing may be provided by system 102 or alternatively provided by a third-party.

The preliminary pricing enables the user to review the alternative travel destinations and select one based on an estimate of the pricing. Because the price estimate may be based on historical and/or predictive pricing, the price estimate is relatively accurate. In various embodiments, the user would be provided with actual real-time pricing in a price itinerary upon selection of a travel destination, which may be the initial travel destination or one of the alternative travel destinations. Embodiments directed to a price itinerary are described in more detail below.

In various embodiments, the alternative travel destinations (e.g., Bahamas and Aruba) have similar attributes to those of the initial travel destination (e.g., Montego Bay).

In one embodiment, system 102 may provide alternative travel destinations that are less expensive than the initial travel destination. This informs the user of more affordable travel destinations that are similar to initial travel destination. In other words, the user may have a similar experience at a more affordable cost. In one embodiment, if system 102 does not identify alternative travel destinations that are cheaper than the initial travel destination, system 102 may display the names of alternative travel destinations without displaying the pricing.

In one embodiment, system 102 may provide alternative travel destinations that are more exotic than the initial travel destination, but at a price that is not significantly more than that of the initial travel destination. For example, the system may display an alternative destination (e.g., Turks and Caicos) that may be considered significantly more exotic than the initial travel destination. In one embodiment, system 102 may identify such an alternative destination based on similar attributes to the initial travel destination and without regard to pricing (e.g., the best match base on similarity). In one embodiment, system 102 may identify such an alternative destination based on similar attributes to the initial travel destination and based on pricing that is not significantly more expensive than the initial travel destination (e.g., the best match that is within a predetermined price range relative to the pricing of the initial travel destination).

In one embodiment, in response to the user selecting a search for travel packages (e.g., using search for packages tab 406 in FIG. 4), system 102 may also display in alternative travel destinations section 510 pricing for vacation packages. In various embodiments, system 102 may display in section pricing for vacation packages in addition to or in lieu of pricing for airfare.

In one embodiment, alternative travel destinations section 510 may include a button 512, clickable link, or the like to enable the user to request additional details about the alternative travel destinations (e.g., "Why these destinations?"). In one embodiment, alternative travel destinations section 510 may also include a button 514 clickable link, or the like to enable the user to request a customized interest profile (e.g., "Find more alternatives"). Embodiments directed to providing additional details about the alternative travel destinations and providing customized interest profiles is described in more detail below in connection with FIG. 6.

Referring again to FIG. 3, in block 308, system 102 causes a price itinerary to be provided to the user. In one embodiment, system 102 provides the price itinerary in response to the user selecting a travel destination. For example, the user may select the initial travel destination or one of the alternative travel destinations.

In one embodiment, system 102 may generate a price itinerary and then provide the price itinerary to the user. In another embodiment, any other suitable system such as a third-party system may generate a price itinerary and provide the price itinerary to the user. In such an embodiment, system 102 may provide travel destination information associated with the travel destination that the user selects to the other system. In one embodiment, system 102 providing the selected travel destination information to the other system may trigger and/or enable the other system to generate real-time pricing, generate a price itinerary, and then provide the price itinerary to the user.

While system 102 is described as performing the steps as described in the embodiments herein, any suitable component or combination of components of system 102 or any suitable processor or processors associated with system 102 may perform the steps described. For example, processor 202 of FIG. 2 may perform the steps described.

Figure 6:
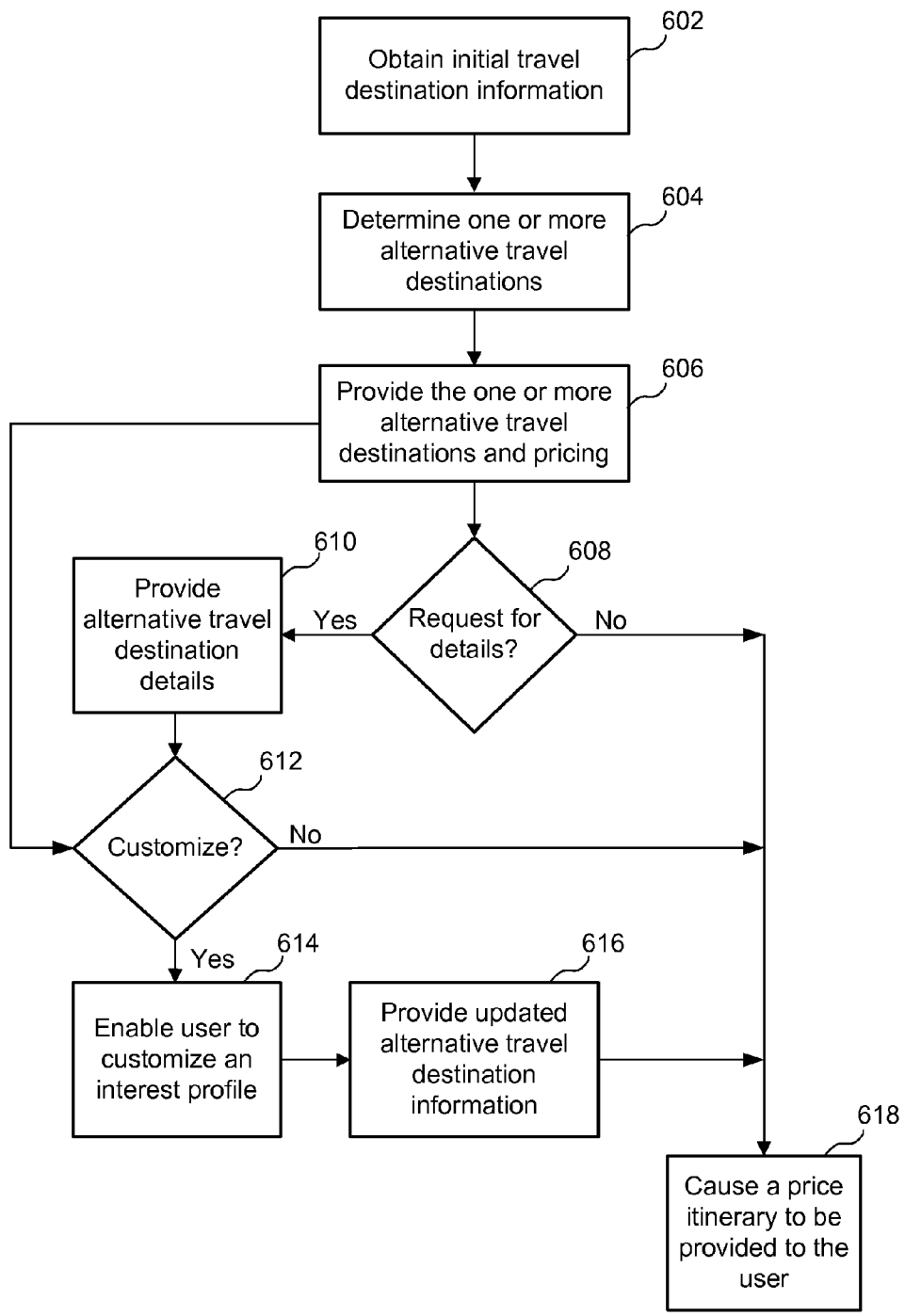
FIG. 6 illustrates an example simplified flow diagram for providing alternative travel destinations, according to one embodiment.

FIG. 6 illustrates an example simplified flow diagram for providing alternative travel destinations, according to one embodiment. Referring to both FIGS. 1 and 6, a method is initiated in block 602, where system 102 obtains initial travel destination information associated with an initial travel destination. As indicated above, the initial travel destination information may be generated based on a search inquiry that is initiated by a user. For example, utilizing a user interface such as user interface 400 of FIG. 4, the user may initiate an inquiry for travel destination information based on search criteria such as a travel destination, a departure date, and/or a return date, where the inquiry results in the travel destination information.

In block 604, system 102 determines one or more alternative travel destinations, where the alternative travel destinations have similar attributes to those of the first travel destination. In various embodiments described herein, system 102 may determine alternative travel destinations based on various policies.

In one embodiment, system 102 may use geographic aspects in an initial selection process (e.g., first filter). System 102 may also apply attribute aspects in a subsequent selection process (e.g., second filter). For example, system 102 may compare and rank attributes of alternative travel destinations against attributes of the initial travel destination in order to identify alternative travel destinations that are most similar to the initial travel destination. System 102 may also use pricing aspects in a subsequent selection process (e.g., third filter). For example, system 102 may compare and rank historical pricing in order to identify alternative travel destinations that are less expensive than the initial travel destination. While the selection processes of this embodiment are described in a certain order, system 102 may perform these selection processes in any order, depending on the particular implementation. Also, system 102 need not perform all of these selection process and/may perform additional selection processes. Embodiments direct to these selection processes and others are described in more detail below.

In one embodiment, with regard to a selection process using geographic aspects, system 102 may determine alternative travel destinations information based on geographic region. The locations and boundaries of such geographic regions may include, for example, world regions (e.g., North America, South American, and other continents, etc.). Other geographic regions are possible (e.g., Caribbean islands, and other clusters of islands, etc.). Example embodiments with regard to policies associated with geographic aspects are described in detail below in connection with FIG. 7.

Figure 7:
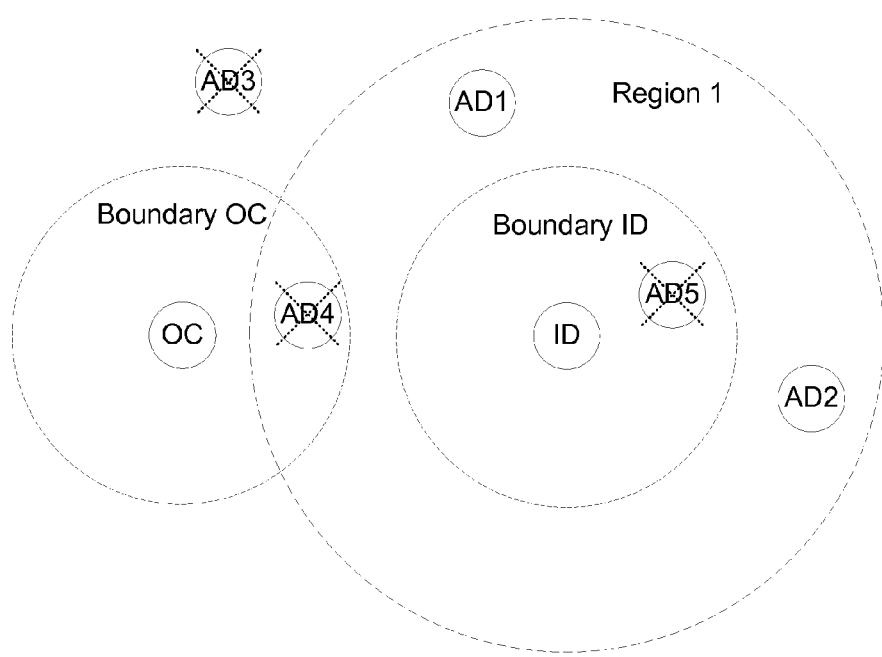
FIG. 7 illustrates an example simplified diagram showing regions and boundaries used to determine alternative travel destinations, according to one embodiment.

FIG. 7 illustrates an example simplified diagram showing regions and boundaries used to determine alternative travel destinations, according to one embodiment. FIG. 7 shows an origin city OC and an initial destination ID. In this example, the determination of the initial destination ID is a result of a search initiated by the user.

As indicated above, system 102 may determine alternative travel destinations based on various policies. For example, in one embodiment, system 102 may identify a particular geographic region in the world based on the location of the initial travel destination. For example, FIG. 7 shows a region, Region 1, which may be at a predetermined distance from origin city OC. The particular distance may vary, depending on the particular implementation. In one embodiment, the distance from the center of Region 1 to origin city OC (e.g., airport of origin city OC) may be derived at least in part from the distance between initial travel destination ID and origin city OC. In one embodiment, the distance from the center of Region 1 to origin city OC may be equal to the distance between initial travel destination ID and origin city OC. In these example embodiments, system 102 may determine Region 1 such that initial travel destination ID is located substantially in the center of Region 1.

In one embodiment, the size of Region 1 may be derived at least in part from the distance between initial travel destination ID and origin city OC. For example, in one embodiment, Region 1 may have a radius is equal to the distance between initial travel destination ID and origin city OC.

In one embodiment, Region 1 may be a geographic region (e.g., North America, Europe, Caribbean islands, etc.). In one embodiment, the distance of the closest portion of the boundary of Region 1 to origin city OC may be derived at least in part from the distance between initial travel destination ID and origin city OC. In these example embodiments, system 102 may determine Region 1 such that initial travel destination ID is located anywhere within Region 1.

Because various aspects of Region 1 (e.g., location and size) may be derived from the distance between the location of initial travel destination ID and origin city OC, such aspects of Region 1 will vary depending each user, and will vary depending on each search performed by each user.

In one embodiment, system 102 may select one or more alternative travel destinations that are located within the identified geographic region (e.g., Region 1). For example, as shown in FIG. 7, system 102 may select alternative travel destinations AD1 and AD2, which are located within Region 1.

In one embodiment, system 102 may select one or more alternative travel destinations based on flight aspects such as flight quality, which is also referred to as travel time. In various embodiments, system 102 may evaluate different flight aspects such as travel time, etc. For example, with regard to travel time, system 102 may estimate the travel time between destinations (e.g., between origin city OC and alternative travel destination AD1, and between origin city OC and alternative travel destination AD2). In various embodiments, although two destinations may be recommended based on their having lower prices than the original destination, system 102 may give one city (e.g., alternative travel destination AD1) preference over another city (e.g., alternative travel destination AD1) because the former city as has a shorter travel time.

In various embodiments, system 102 may give preference to a given destination in the form of a weighting value for each different aspect. For example, in one embodiment, system 102 may determine and assign a weighting value for each of the aspects (e.g., flight time, geographic distance, price, most similar activities). As such, system 102 may select one or more alternative travel destinations based on a combination of these aspects.

In one embodiment, system 102 may exclude travel destinations as possible alternative travel destinations based on various policies. In one embodiment, system 102 may exclude travel destinations that are located outside the identified geographic region. For example, in one embodiment, as shown in FIG. 7, system 102 may exclude travel destinations such as alternative destination AD3 that are located outside Region 1.

In one embodiment, system 102 may exclude destinations that are within a predetermined distance from origin city OC (e.g., within Boundary OC). For example, system 102 may exclude alternative travel destination AD4, even though it is located within Region 1, because it is also located within Boundary OC. Similarly, in one embodiment, system 102 may exclude destinations that are within a predetermined distance from initial travel destination (e.g., within Boundary ID). For example, system 102 may exclude alternative travel destination AD5, even though it is located within Region 1, because alternative travel destination AD5 is also located within Boundary ID.

Such predetermined distances (e.g., radius of Boundary OC or radius of Boundary ID) may be equal or unequal, and each may vary. The particular predetermined distances will depend on the particular implementation. For example, in one embodiment, the predetermined distances may be a driving distance, and the particular driving distance may vary and will depend on the particular implementation. One reason for such exclusions is that the user can drive a car from origin city OC to alternative travel destination AD4, or from initial travel destination ID to alternative travel destination AD5. As such, system 102 may find other travel destinations (e.g., alternative travel destinations AD1 and AD2) that serve as better alternatives to initial travel destination ID.

In one embodiment, system 102 may also determine alternative travel destinations based on other policies. For example, in one embodiment, system 102 may rank travel destinations based on their attributes that are similar to those attributes of the initial travel destination, and then select one or more of the top-most ranked travel destinations. Such attributes may include various activities (e.g., beach activities, sport activities such as golf, tennis, and water sports, cultural activities such as music, festivals, museums, etc.).

In various embodiments, as indicated above, system 102 may also determine alternative travel destinations based on pricing. For example, system 102 may provide alternative travel destinations that having pricing that is less expensive than the pricing of the initial travel destination, yet have similar attributes to those of the initial travel destination.

In block 606, system 102 provides the one or more alternative travel destinations and corresponding pricing to the user. System 102 may provide a list of the alternative travel destinations and related information (e.g., prices) similar to alternative travel destinations section 510 of FIG. 5. As indicated above, in one embodiment, the corresponding pricing includes preliminary pricing based on historical and/or predictive pricing.

In one embodiment, system 102 enables the user to request detailed information associated with the alternative travel destinations. For example, referring to FIG. 5, system 102 may provide the user with a button (e.g., button 512) for requesting more details on the alternative travel destinations.

In block 608, in response to receiving a request from the user for detailed information associated with the alternative travel destinations, system 102 provides the detailed information associated with the alternative travel destinations, in block 610.

Figure 8:
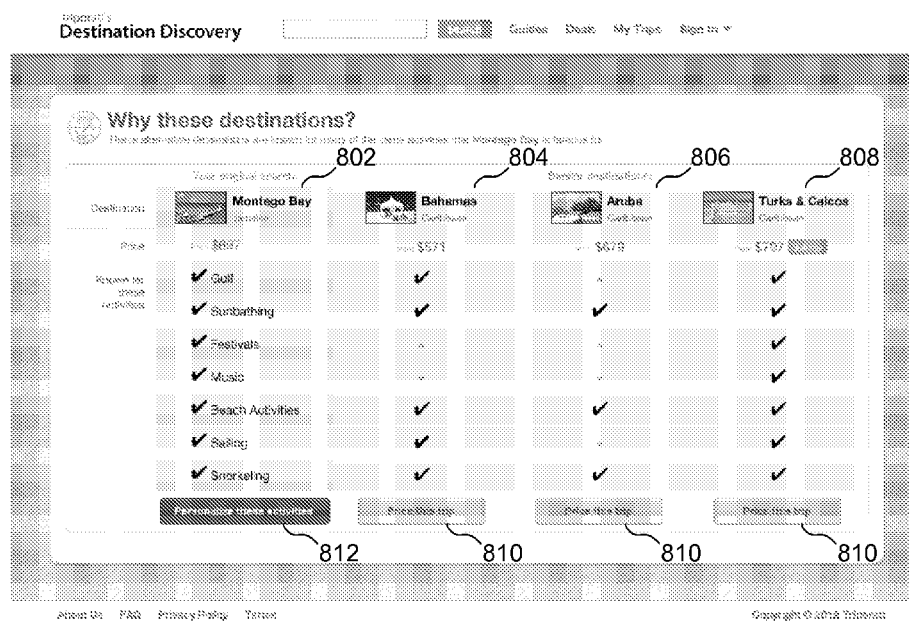
FIG. 8 illustrates an example simplified user interface that shows detailed information associated with the alternative travel destinations, according to one embodiment.

FIG. 8 illustrates an example simplified user interface 800 that shows detailed information associated with the alternative travel destinations, according to one embodiment. In one embodiment, user interface 800 may include a tab (not shown) that enables the user to return to or toggle to another user interface described herein. As shown, user interface 800 shows various attributes present for each alternative travel destination. In one embodiment, user interface 800 includes a checklist of attributes for quick comparison.

For example, referring to column 802, in one embodiment, user interface 800 may show the initial travel destination (e.g., Montego Bay), a price (e.g., $697), and a list of activities that that travel destination is known for (e.g., golf, sunbathing, festivals, music, beach activities, sailing, snorkeling, etc.). As shown in FIG. 8, the checks indicate that this particular destination is known for each of the checked activities.

Referring to column 804, user interface 800 may show an alternative travel destination (e.g., Bahamas), a price (e.g., $571), and a list of activities that that travel destination is known for (e.g., golf, sunbathing, beach activities, sailing, snorkeling, etc.). As shown, the checks indicate that this particular destination is known for each of the checked activities.

Referring to column 806, user interface 800 may show another alternative travel destination (e.g., Aruba), a price (e.g., $679), and a list of activities that that travel destination is known for (e.g., sunbathing, beach activities, snorkeling, etc.). As shown, the checks indicate that this particular destination is known for each of the checked activities.

Referring to column 808, user interface 800 may show another alternative travel destination (e.g., Turks and Caicos), a price (e.g., $797), and a list of activities that that travel destination is known for (e.g., golf, sunbathing, festivals, music, beach activities, sailing, snorkeling, etc.). As shown, the checks indicate that this particular destination is known for each of the checked activities.

As shown in columns 804 and 806, system 102 may find one or more alternative destinations with pricing that is less than the pricing of the initial travel destination, yet with similar attributes (e.g., similar activities) to those activities of the initial travel destination. Also, as shown in column 808, system 102 may find one or more alternative destinations with pricing may be more than the pricing of the initial travel destination, yet with the same attributes (e.g., same activities) to those activities of the initial travel destination and perhaps more exotic and desirable. For each of these example alternative destinations, system 102 provides the user with details in order to facilitate the user is selecting a travel destination.

In one embodiment, user interface 800 includes one or more buttons to enable the user to select a destination for pricing (e.g., buttons 810 "Price this trip"). In response to the user selecting one of buttons 810, system 102 provides a price itinerary for the particular travel destination, as described in detail below in connection with block 618. As indicated above, in one embodiment, the price itinerary includes real-time pricing.

In one embodiment, system 102 enables the user to customize an interest profile. In various embodiments, an interest profile specifies particular interests of a user (e.g., activities of interest). For example, in one embodiment, user interface 800 includes one or more buttons (e.g., a button 812 "Personalize these activities") to enable the user to customize an interest profile. Embodiments directed to customization of an interest profile are described in detail below in connection with block 612.

In block 612, in response to receiving a request from the user to customize an interest profile, system 102 enables the user to provide preferences for customizing an interest profile, in block 614. In one embodiment, system 102 provides a profile interface for customizing an interest profile.

Note that the user need not necessarily request alternative travel destination details in order to subsequently request a customized interest profile. For example, in one embodiment, the user can request a customized interest profile after viewing the alternative travel destinations information (e.g., via button 514 shown in FIG. 5).

Figure 9:
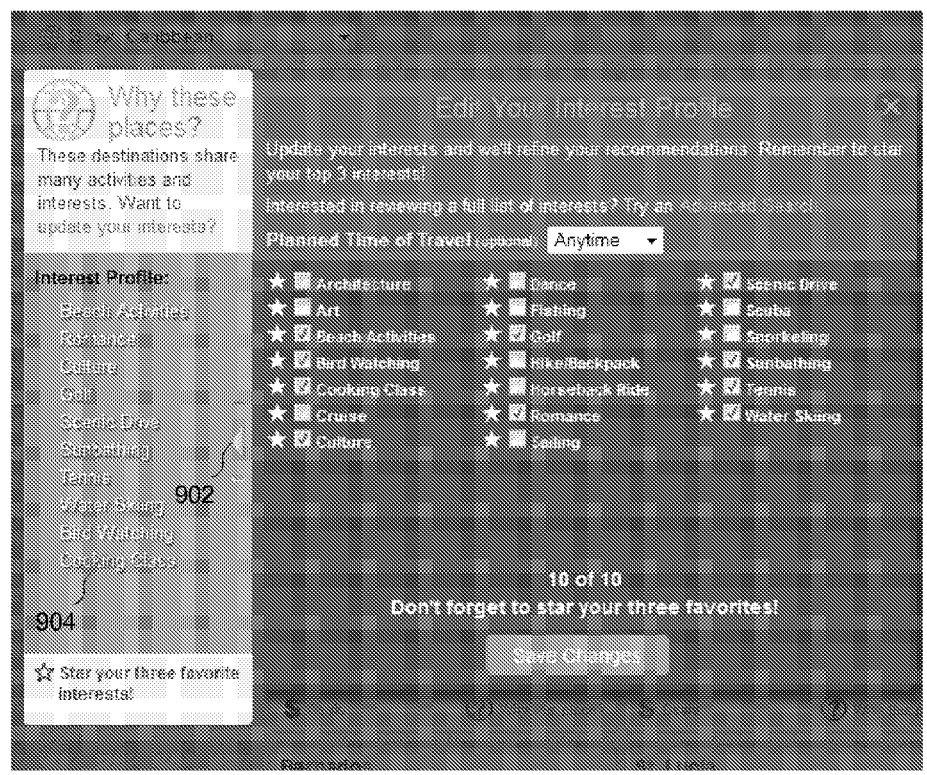
FIG. 9 illustrates an example simplified user interface for customizing an interest profile, according to one embodiment.

FIG. 9 illustrates an example simplified user interface 900 for customizing an interest profile, according to one embodiment. In one embodiment, user interface 900 may include a tab (not shown) that enables the user to return to or toggle to another user interface described herein. In one embodiment, user interface 800 may be an overlay interface over user interface 900. For example, in one embodiment, system 102 may enable the user to toggle (e.g., using a tab 902) user interface 800 open and closed (like a drawer) such that user interface 900 may remain in the background.

As shown, user interface 900 shows various attributes that the user may select. In one embodiment, user interface 900 includes check boxes adjacent to attribute labels, where the user may select a given attribute by checking the adjacent box.

System 102 enables the user to select one or more attributes (e.g., by checking boxes) and enables the user to save the interest profile. As shown in this particular example, several boxes associated with various interests/activities are checked (e.g., beach activities, bird watching, cooking class, culture, golf, romance, scenic drive, sunbathing, tennis, and water skiing). The list of activities is an example, and particular list of activities may include fewer items or more items than shown, depending on the particular implementation. After the user saves the changes, system 102 updates the alternative travel destinations. In one embodiment, system 102 may show a list 904 of the currently saved attributes associated with the user's interest profile.

In block 616, system 102 provides updated alternative travel destination information to the user, where the updated alternative travel destination information includes alternative travel destinations and corresponding pricing. In one embodiment, the resulting updated alternative travel destination information is based on the customized interested profile. An example user interface showing updated alternative travel destination information is described in more detail below in connection with FIG. 10.

Figure 10:
FIG. 10 illustrates an example simplified user interface for displaying various alternative travel destinations, according to one embodiment.

FIG. 10 illustrates an example simplified user interface 1000 for displaying various alternative travel destinations, according to one embodiment. In one embodiment, user interface 1000 may include a tab (not shown) that enables the user to return to or toggle to another user interface described herein. In one embodiment, system 102 may rank the alternative travel destinations based on similarity of attributes and the user's interest profile. System 102 may cause the highest ranking alternative travel destinations to be displayed on the first page of alternative travel destinations. In one embodiment, system 102 may order the alternative travel destinations (e.g., from left to right, from top to bottom, etc.) based on their rankings.

In block 618, system 102 causes a price itinerary to be provided to the user. In one embodiment, system 102 causes the price itinerary to be provided to the user in response to the user selecting a travel destination. For example, the user may select the initial travel destination or one of the alternative travel destinations.

In one embodiment, system 102 may generate a price itinerary and then provide the price itinerary to the user. In another embodiment, any other suitable system such as a third-party system may generate a price itinerary and provide the price itinerary to the user. In such an embodiment, system 102 may provide to the other system travel destination information associated with the travel destination that the user selects. System 102 providing the selected travel destination information to the other system may trigger and/or enable the other system to generate a price itinerary and then provide the price itinerary to the user.

In various embodiments, the user has several opportunities to finalize the process and select a travel destination. For example, the user may select a travel destination after viewing the alternative travel destination information (e.g., alternative travel destinations and pricing), after viewing the alternative travel destination details, or after viewing updated alternative travel destination information based on a customized interest profile. In response to receiving a selection, system 102 provides a price itinerary accordingly.

Although the description has been described with respect to particular embodiments thereof, these particular embodiments are merely illustrative, and not restrictive. Any suitable programming language may be used to implement the routines of particular embodiments including C, C++, JAVA, assembly language, etc. Different programming techniques may be employed such as procedural or object-oriented. The routines may execute on a single processing device or on multiple processors. Although the steps, operations, or computations may be presented in a specific order, the order may be changed in particular embodiments. In some particular embodiments, multiple steps shown as sequential in this specification may be performed at the same time.

Particular embodiments may be implemented in a computer-readable storage medium (also referred to as a machine-readable storage medium) for use by or in connection with an instruction execution system, apparatus, system, or device. Particular embodiments may be implemented in the form of control logic in software or hardware or a combination of both. The control logic, when executed by one or more processors, may be operable to perform that which is described in particular embodiments.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real time," "offline," in a "batch mode," etc. Portions of processing may be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general purpose digital computer, by using application specific integrated circuits, programmable logic devices, field programmable gate arrays, optical, chemical, biological, quantum or nanoengineered systems, components and mechanisms. In general, the functions of particular embodiments may be achieved by any means known in the art. Distributed, networked systems, components, and/or circuits may be used. Communication or transfer of data may be wired, wireless, or by any other means.

It will also be appreciated that one or more of the elements depicted in the drawings/figures may also be implemented in a more separated or integrated manner, or even removed or rendered as inoperable in certain cases, as is useful in accordance with a particular application. It is also within the spirit and scope to implement a program or code that is stored in a machine-readable medium to permit a computer to perform any of the methods described above.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise.

While one or more implementations have been described by way of example and in terms of the specific embodiments, it is to be understood that the implementations are not limited to the disclosed embodiments. To the contrary, they are intended to cover various modifications and similar arrangements as would be apparent to those skilled in the art. Therefore, the scope of the appended claims should be accorded the broadest interpretation so as to encompass all such modifications and similar arrangements.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A computer-implemented method comprising:
    obtaining first travel destination information associated with a first travel destination;
    determining by a processor one or more alternative travel destinations based on similarities between each alternative travel destination and the first travel destination and based on pricing wherein the determining comprises excluding one or more alternative travel destinations that are either within a predetermined distance from an origin city or within a predetermined distance from the first travel destination; and
    causing a user interface to display a comparison between the first travel destination and the one or more alternative travel destinations, wherein the comparison indicates the pricing of the first travel destination compared to the pricing of the one or more alternative travel destinations, and wherein the comparison indicates which attributes of each of the one or more alternative travel destinations are similar those attributes of the first travel destination.

2. The method of claim 1, wherein the determining comprises applying a plurality of selection processes, and wherein the selection processes are based on one or more of geographic aspects, flight aspects, attribute aspects, and pricing aspects.

3. The method of claim 1, wherein the determining comprises:
    identifying a geographic region based on a distance between the first travel destination and an origin city; and
    selecting one or more alternative travel destinations that are located within the geographic region.

4. The method of claim 1, wherein the attributes include various activities including one or more of beach activities, sport activities, and cultural activities.

5. The method of claim 1, wherein the determining comprises:
    ranking alternative travel destinations based on their attributes that are similar to those attributes of the first travel destination; and
    selecting one or more of the top-most ranked alternative travel destinations.

6. The method of claim 1, wherein the comparison includes a checklist of attributes for comparison between the first travel destination and the one or more alternative travel destinations.

7. The method of claim 1, wherein the provided pricing is preliminary pricing based on historical pricing.

8. The method of claim 1, further comprising causing a price itinerary to be provided to a user in response to the user selecting a travel destination.

9. Software encoded in one or more computer-readable media for execution by the one or more processors and when executed operable to perform operations comprising:
- obtaining first travel destination information associated with a first travel destination;
- determining one or more alternative travel destinations based on similarities between each alternative travel destination and the first travel destination and based on pricing, wherein the determining comprises excluding one or more alternative travel destinations that are either within a predetermined distance from an origin city or within a predetermined distance from the first travel destination; and
- causing a user interface to display a comparison between the first travel destination and the one or more alternative travel destinations, wherein the comparison indicates the pricing of the first travel destination compared to the pricing of the one or more alternative travel destinations, and wherein the comparison indicates which attributes of each of the one or more alternative travel destinations are similar those attributes of the first travel destination.

10. The software of claim 9, wherein to determine the one or more alternative travel destinations, the software when executed is further operable to perform operations comprising applying a plurality of selection processes, and wherein the selection processes are based on one or more of geographic aspects, flight aspects, attribute aspects, and pricing aspects.

11. The software of claim 9, wherein to determine the one or more alternative travel destinations, the software when executed is further operable to perform operations comprising:
- identifying a geographic region; and
- selecting one or more alternative travel destinations that are located within the geographic region.

12. The software of claim 9, wherein to determine the one or more alternative travel destinations, the software when executed is further operable to perform operations comprising excluding one or more alternative travel destinations based on one or more policies.

13. The software of claim 9, wherein the attributes include various activities including one or more of beach activities, sport activities, and cultural activities.

14. The software of claim 9, wherein to determine the one or more alternative travel destinations, the software when executed is further operable to perform operations comprising:
- ranking alternative travel destinations based on their attributes that are similar to those attributes of the first travel destination; and
- selecting one or more of the top-most ranked alternative travel destinations.

15. The software of claim 9, wherein the provided pricing is less expensive than the pricing of the initial travel destination.

16. A computer-implemented method comprising:
- obtaining first travel destination information associated with a first travel destination;
- determining by a processor one or more alternative travel destinations based on similarities between each alternative travel destination and the first travel destination and based on pricing wherein the determining comprises excluding one or more alternative travel destinations that are either within a predetermined distance from an origin city or within a predetermined distance from the first travel destination;
- causing a user interface to display a comparison between the first travel destination and the one or more alternative travel destinations, wherein the comparison indicates the pricing of the first travel destination compared to the pricing of the one or more alternative travel destinations, and wherein the comparison indicates which attributes of each of the one or more alternative travel destinations are similar those attributes of the first travel destination enabling a user to customize an interest profile, wherein the interest profile specifies particular interests of the user; and
- providing updated alternative travel destinations to the user based on the customized interest profile.

17. The method of claim 16, wherein the determining comprises applying a plurality of selection processes, and wherein the selection processes are based on one or more of attribute aspects and pricing aspects.

18. The method of claim 16, wherein the provided pricing is less expensive than the pricing of the initial travel destination.

19. The method of claim 16, further comprising causing a price itinerary to be provided to a user in response to the user selecting a travel destination.

* * * * *